United States Patent
Watanuki

(12) 
(10) Patent No.: US 6,195,871 B1
(45) Date of Patent: Mar. 6, 2001

(54) METHOD OF MANUFACTURING MAGNETIC HEAD ELEMENTS

(75) Inventor: Motoichi Watanuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/412,218

(22) Filed: Oct. 5, 1999

(30) Foreign Application Priority Data

Dec. 21, 1998 (JP) .................................................. 10-362667

(51) Int. Cl.[7] .................................................. G11B 5/42
(52) U.S. Cl. ................................... 29/603.09; 29/603.12
(58) Field of Search ........................... 29/603.09, 603.1, 29/603.12

(56) References Cited

U.S. PATENT DOCUMENTS 4,841,625 * 6/1989 Valstyn ................................. 29/603.1
5,911,455 * 6/1999 Draaisma et al. ............. 29/603.09 X

FOREIGN PATENT DOCUMENTS 10-289413   10/1998 (JP).

* cited by examiner

Primary Examiner—Carl E. Hall
(74) Attorney, Agent, or Firm—Greer, Burns & Crain, Ltd.

(57) ABSTRACT

In this method of manufacturing magnetic head elements, the width of the ELG elements can be narrower and the number of magnetic head elements manufactured can be increased. The method includes the steps of: lapping a bar-shaped member in which magnetic head element sections and ELG elements are alternately formed; monitoring resistance of the ELG elements; and removing the ELG elements so as to divide the bar-shaped member into a plurality of the magnetic head element sections. A lead layer of each ELG element is connected to the nearest inner lead layer of the adjacent magnetic head element section, and a connecting pad is connected to a pad for monitoring the ELG element. Terminal pillars in the lead layers act as a common terminal pillar of the magnetic head element section and the ELG element.

6 Claims, 3 Drawing Sheets

METHOD OF MANUFACTURING MAGNETIC HEAD ELEMENTS

BACKGROUND OF THE INVENTION

The present invention relates to a method of manufacturing magnetic head elements (MR/GMR head elements), in which the width of ELG (Electric Lapping Guide) elements for monitoring the lapping process can be narrow so as to the increase number of magnetic head elements that can be manufactured.

Magnetic head elements used in magnetic disk drive units, and similar devices, are manufactured by forming magnetic layers, non-magnetic layers, and other layers on a wafer-shaped ceramic substrate. A plurality of sensing portions, each including a magnetic resistance effect head (a reading head) including an MR element an electromagnetic converting head (a recording head), and terminals (pads) connected thereto are formed on the substrate.

The magnetic head elements are formed by the steps of:
forming magnetic head element sections and terminals in the substrate; dividing the wafer into thin bar-shaped members 10 (see FIG. 6); and lapping a side face of the bar-shaped member (work piece). The bar-shaped member 10 is made by cutting the wafer, and tens of magnetic head element sections 12 are arranged therein.

The side face of the bar-shaped member 10 is lapped so as to adjust height (MR height) of the sensing portions including the layered MR elements, etc. to a prescribed height. If the height of the sensing portions is lower, the sensivity thereof can be higher. These days, the required MR height of the magnetic head element is 0.8 $\mu$m±0.2 $\mu$m, and it will be 0.4 $\mu$m±0.05 $\mu$m in the future.

As described above, the manufacturing accuracy of the sensing portions is extremely high, so lapping the bar-shaped member 10 a problem. In a conventional method, ELG elements are used when the bar-shaped member 10 is lapped.

In the bar-shaped member 10, each ELG element section 14 is adjacent to each magnetic head element section 12. Each ELG element 14 is used to control the amount of lapping of the adjacent magnetic head element section 12.

As described above, tens of the magnetic head element sections 12 are formed in the bar-shaped member 10, and high machining accuracy is required for each element section. Thus, the ELG element 14 is adjacent to the side of each magnetic head element section 12 so as to control the amount of lapping for each magnetic head element section 12 and to increase the machining accuracy.

In FIG. 6, reference numerals 16 stand for the element portions of the magnetic head element sections 12. Connecting pads 18a and 18b for reproducing, and connecting pads 20a and 20b for recording are formed on a surface of the bar-shaped member 10.

Pads 22a and 22b are formed on a surface of the ELG element 14.

FIG. 7 is a sectional view of the ELG element 14 taken along line A–A' in FIG. 6; FIG. 8 is a sectional view of the ELG element 14 taken along line a–a' in FIG. 6.

A non-magnetizable substrate, e.g., an $Al_2O_3TiC$ substrate, is provided and a protecting layer 26 which is made of, for example, alumina, is formed on the substrate 25.

A lower shielding layer 27, which is made of sendust, is formed on the protecting layer 26. An alumina layer 28, which acts as a read-gap, is formed on the lower shielding layer 27. The MR element portions (sensing portions) 30, which are well known, are formed on the alumina layer 28.

Hard layers 31, for controlling magnetic domains, are made of CoCrPt, and they are respectively connected to both ends of each MR element portion 30. Lead layers 32, which are made of, for example, copper, are formed on the hard layers 31.

Terminal pillars 33, which are made of, for example, copper, are respectively formed at ends of the lead layers 32 as shown in FIG. 8.

The terminal pillars 33 are formed by plating holes in resist layers (not shown). The resist layers are removed.

An alumina layer 35, which acts as read-gaps and write-gaps, is formed on the alumina layer 28 and the lead layers 32.

An overcoating alumina layer 36 covers over the alumina layer 35 and the terminal pillars 33 to protect them.

The overcoating alumina layer 36 will be lapped until the terminal pillars 33 are exposed, then the monitor pads 22a and 22b, which are made of gold, will be formed on the exposed upper end faces of the terminal pillars 33.

The magnetic head element sections 12 are formed on the non-magnetizable substrate 25, by a known manner. In particular, the layer-structures of the sensing portions are almost the same as those of the ELG elements 14.

The connecting pads 18a and 18b are connected to the sensing part (not shown), which includes the MR element of the element portion 16 via the terminal pillars 38 (shown by dotted lines in FIG. 6). These pads 18a and 18b, as well as the terminal pillar 33 on the ELG element 14 side, inner lead layers 39 are made of, for example, copper.

The connecting pads 20a and 20b are connected to a thin coil layer (not shown) of the element portion 16 via the terminal pillars 41 (shown by dotted lines in FIG. 6). These pads are made of copper, for example, are as the terminal pillar 33 on the ELG element 14 side, and inner lead layers 41.

The bar-shaped member 10 is secured in a proper jig (not shown) and the side face P (see FIG. 6) is lapped. The MR element portions of the ELG elements 14 and the MR element portions of the magnetic head element sections 12 are simultaneously lapped. The jig has pressing means (not shown) capable of respectively pressing the magnetic head element sections 12 and the ELG elements 14 onto lapping means, and the lapping speed is adjusted so as to simultaneously complete the lapping work of all the magnetic head elements 12.

While performing the lapping work, the ELG elements 14 are connected to a monitor means (not shown) by the pads 22a and 22b, and the change in resistance of the MR element portions 30, which changes while lapping the MR element portions 30, is detected. The shape of the MR element portion of the magnetic head element section 12 and the shape of the MR element portion of the ELG element 14 should be same or very similar. By detecting the change in resistance of the MR element portions 30, the change of the resistance of the MR element portions of the magnetic head element sections 12 can be known, so that the lapping work is executed until the MR height of the MR element portions of the magnetic head element sections 12 reach a prescribed height.

By placing the ELG elements 14 adjacent to the magnetic head element sections 12 for monitoring purposes, the MR height can be controlled with higher accuracy.

After the lapping work, the bar-shaped member 10 is cut along the ELG elements 14 to divide the member 10 into a plurality of magnetic head element sections 12.

Since the ELG elements 14 are used for monitoring purposes only and are removed from the final products, width of the ELG elements 14 should be narrow so as to manufacture many magnetic head element sections 12 in one bar-shaped member 10.

FIG. 9 shows a state in which the overcoating alumina layer 36 is formed to cover the terminal pillars 33, 38 and 41 after the terminal pillars 33, 38 and 41, whose height are about 20-30 $\mu$m, are formed. When the overcoating alumina layer 36 is formed by spattering, abnormal layers 37 (shown by dotted lines) are formed beside the terminal pillars 33, 38 and 41 due to step coverage thereof.

If separations between the terminal pillars 33, 38 and 41 are narrow, the abnormal layers 38 are high (see FIG. 10), and holes are opened when the terminal pillars are exposed by lapping. Note that, a line Q indicates a lapping face. To prevent forming the holes, the separations between the terminal pillars should be at least 100 $\mu$m.

When the ELG elements 14 are cut, if the abnormal layers 37 are cut, chipping occurs because the abnormal layers are weak. To avoid chipping, the separation between the terminal pillar and the cutting line should be at least 55 $\mu$m.

As described above, the width of the ELG element 14 is defined by spaces in which the terminal pillars are formed, so the minimum width is 300 $\mu$m, and it cannot be narrower.

SUMMARY OF THE INVENTION

An object of the present invention is to provide a method of manufacturing magnetic head elements, in which the width of the ELG elements can be narrower and the number of manufactured magnetic head elements can be increased.

To achieve this objective, the method of the present invention comprises the steps of: lapping a bar-shaped member in which a plurality of magnetic head element sections and ELG elements are formed adjacent to each other monitoring the resistance of the lapped ELG elements; and removing the ELG elements so as to divide the bar-shaped member into a plurality of magnetic head element sections. The lead layer of each ELG element is connected to the nearest inner lead layer of the adjacent magnetic head element section by a connecting section. A connecting pad, which is formed on an upper end face of a terminal pillar connected to the inner lead layer and located nearest to the ELG element, is connected to a pad for monitoring the ELG element by a connecting section, whereby the terminal pillar acts as a common terminal pillar of the magnetic head element section and the ELG element.

In the method of the present invention, the terminal pillars, which are formed in the conventional ELG element, are omitted, and the terminal pillars of the magnetic head element sections are used as the common terminal pillars, so that the number of manufactured the magnetic head elements can be increased and manufacturing efficiency can be improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

The present invention will now be described in detail with reference to the accompanying drawings.

Figure 1:
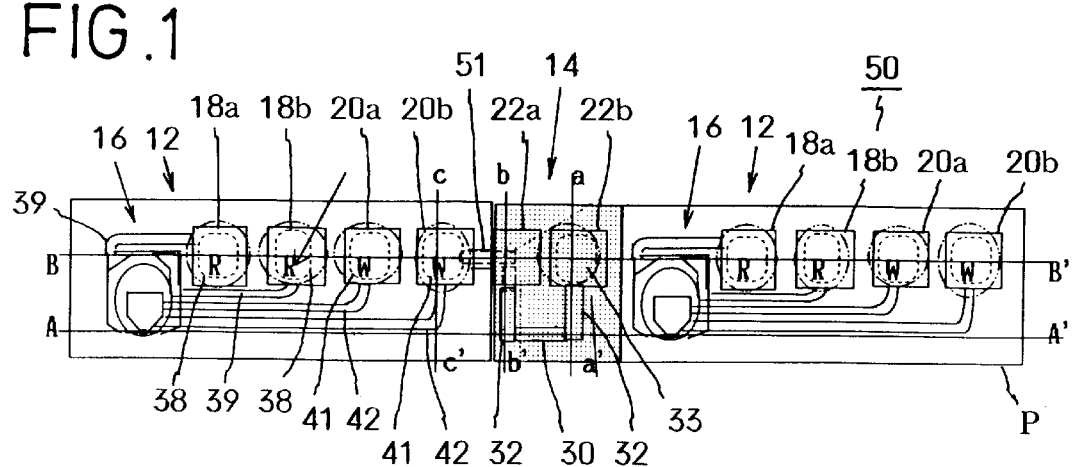
FIG. 1 is a front view of a bar-shaped member.
Figure 2:
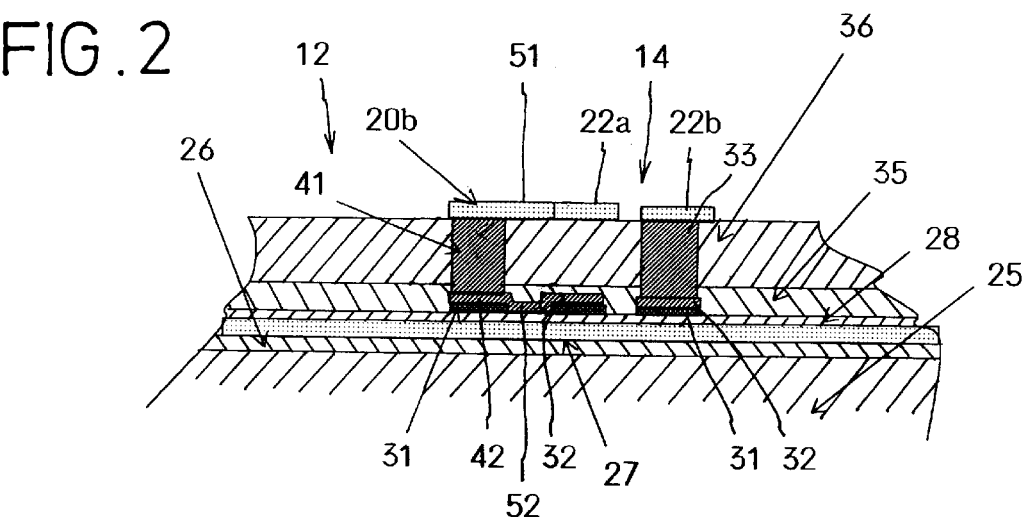
FIG. 2 is a sectional view taken along a line B–B' of FIG. 1.
Figure 3:
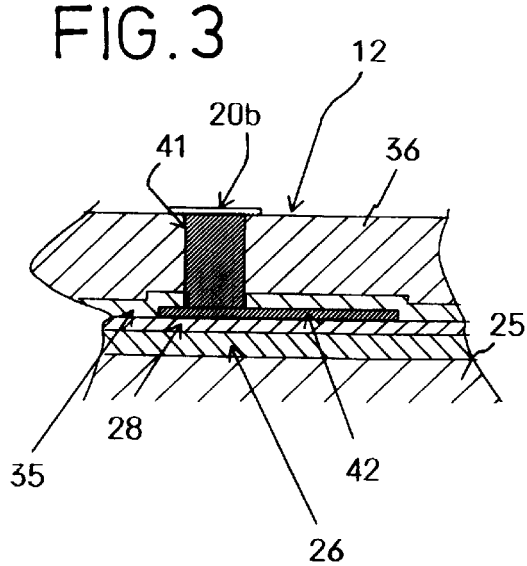
FIG. 3 is a sectional view taken along a line c–c' of FIG. 1.
Figure 4:
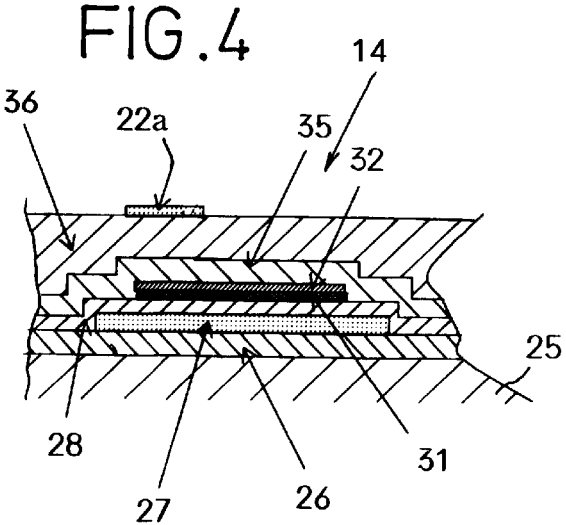
FIG. 4 is a sectional view taken along a line b–b' of FIG. 1.

FIG. 1 is a front view of a bar-shaped member 50; FIG. 2 is a sectional view taken along a line B–B' of FIG. 1; FIG. 3 is a sectional view taken along a line c–c' of FIG. 1; and FIG. 4 is a sectional view taken along a line b–b' of FIG. 1.

Figure 6:
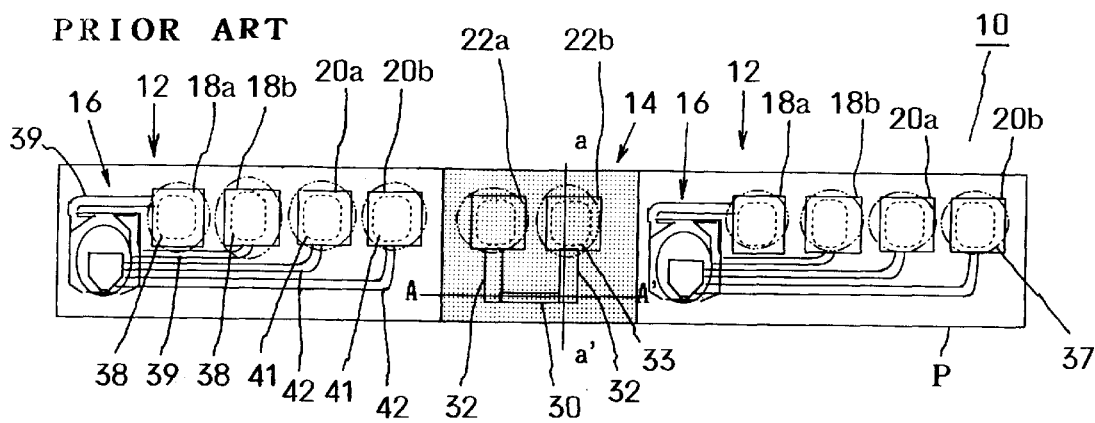
FIG. 6 is a front view of the conventional bar-shaped member.
Figure 7:
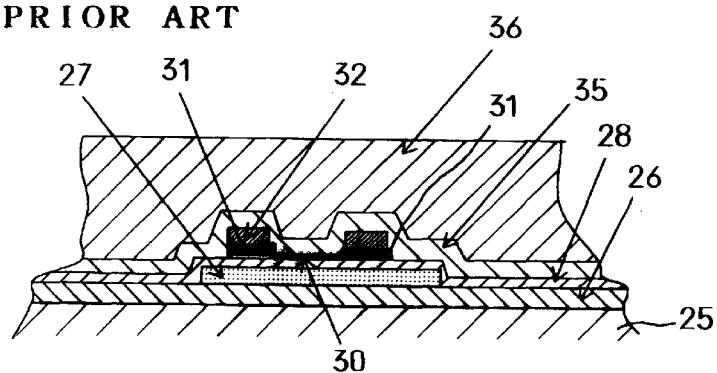
FIG. 7 is a sectional view taken along the line A–A' of FIG. 6.
Figure 8:
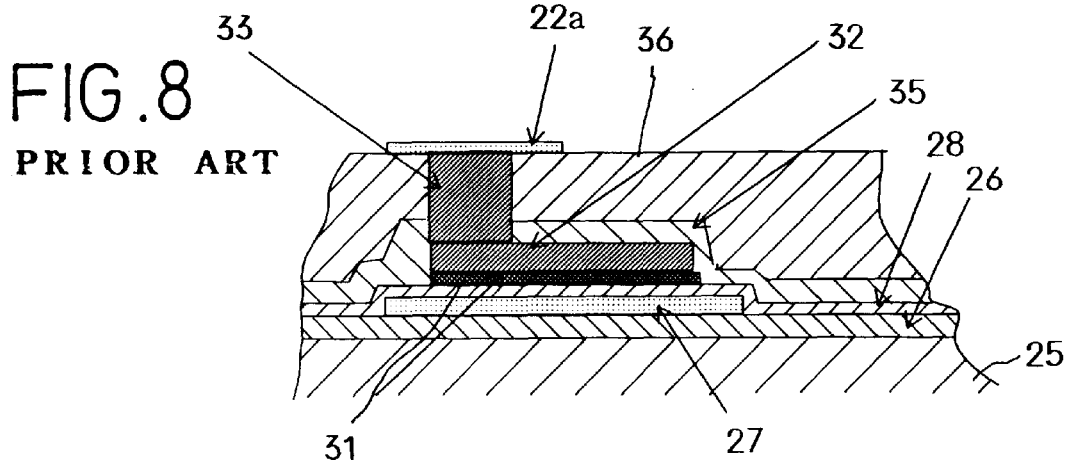
FIG. 8 is a sectional view taken along the line a–a' of FIG. 6.
Figure 9:
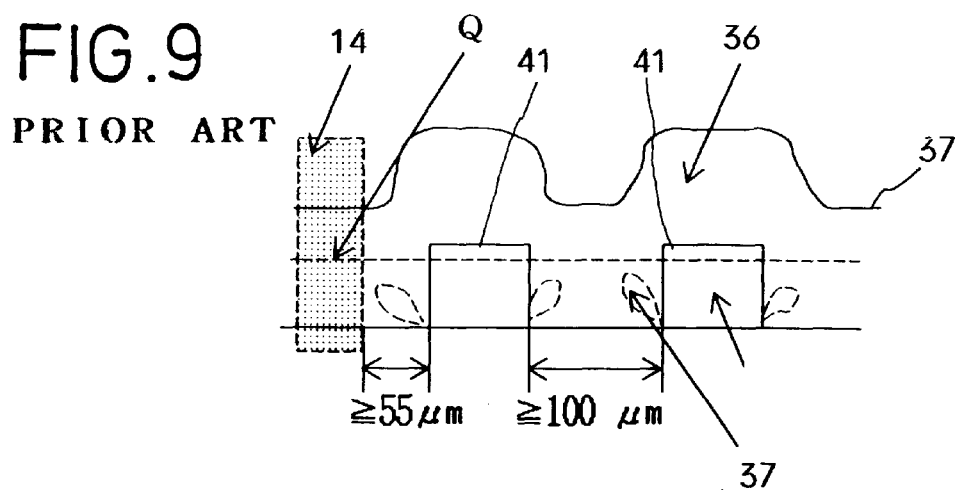
FIG. 9 is a perspective view of the abnormal layers in the overcoating alumina layer.
Figure 10:
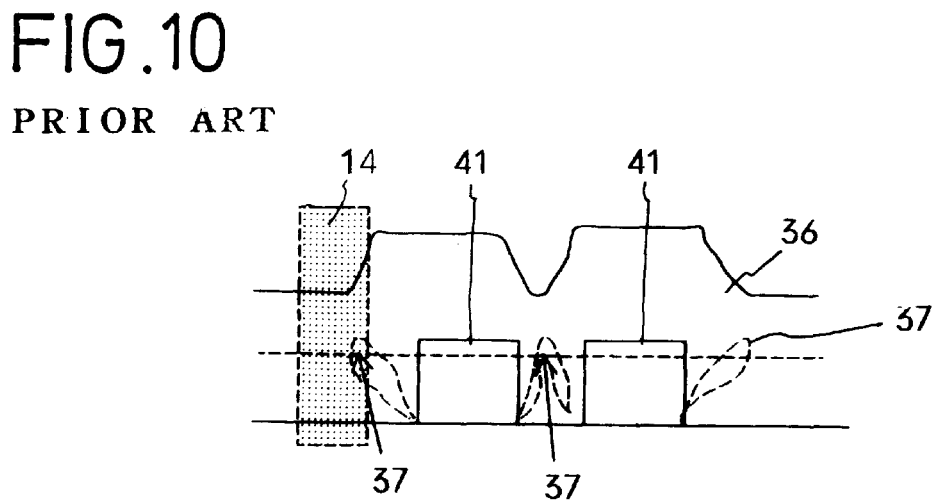
FIG. 10 is a perspective view of the abnormal layers in the overcoating alumina layer.

Note that, members shown in FIGS. 6–8 are assigned the same symbols and explanation will be omitted.

A sectional view taken along a line A–A' is equal to FIG. 7; a sectional view taken along a line a–a' is equal to FIG. 8.

In the present embodiment, terminal pads 33 (see FIG. 8), which are made of copper and connected to the pads 22a for monitoring the ELG elements 14, are not formed. A terminal pillar 41 of each magnetic head element 12 which is located nearest to the adjacent ELG element 14 is used instead of the terminal pillar 33.

Thus, each pad 20a and each pad 22b are connected by a narrow connecting section 51.

As shown in FIG. 2, the lead layer 32 of the ELG element 14 and an inner lead layer 42 of the magnetic head element section 12 which is located nearest to the lead layer 32, are connected by a narrow connecting section 52.

The connecting section 51 is simultaneously formed when the gold pads 20a and 22a are formed by sputtering.

The connecting section 51 is simultaneously formed when the lead layer 32 and the inner lead layer 42 are formed by sputtering.

In the present embodiment, as clearly shown in FIG. 2, terminal pillars 33, each of which is located between the terminal pillar 41 and the terminal pillar 33 in the conventional bar-shaped member 10, are omitted.

In FIG. 2, even if the width of the ELG element 14 is narrow, the width between the terminal pillars 33 and 41 can be designed wide enough, so that forming the abnormal layers between the pillars 33 and 41 can be restricted. Therefore, chipping, which occurs when the ELG elements 14 are cut and removed, can be prevented.

After the ELG elements 14 are cut and removed, parts of the connecting sections 51 and 52 are left on the magnetic head elements, but they are quite small, so characteristics of the magnetic head elements are not influenced.

In the present embodiment, the terminal pillars 41 connected to the recording pads 20a are used as the common terminal pillars of the ELG elements 14. In the case that the recording pads 18a and 18b are adjacent to the ELG element 14, one of the terminal pillars 39, which is located nearest to the ELG element 14, is used as the common terminal pillar.

In the above described embodiment, the magnetic head element (slider) is a side-element type element in which the element portion 16 is located at an end part thereof.

Figure 5:
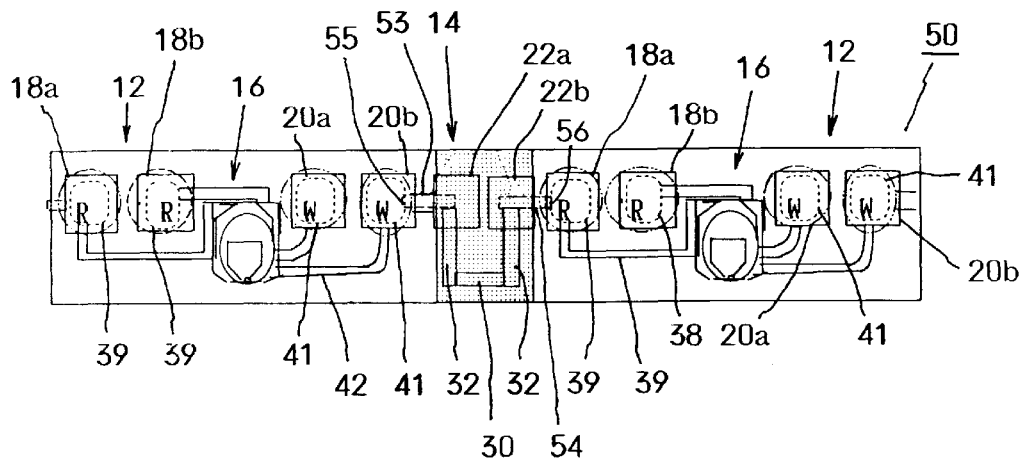
FIG. 5 is a front view of a bar-shaped member including center-element type magnetic head elements.

Another embodiment is shown in FIG. 5. The magnetic head elements are center-element type elements, in each of which the element portion 16 is located between the recording pads 20a and 20b. With this structure, the width of the ELG elements can be narrower.

In the case of the center-element type elements, the reproducing pad 18a of one magnetic head element section 12 is closely located on one side of the ELG element 14; the recording pad 20b of another magnetic head element section 12 is closely located on the other side thereof.

Thus, both of the terminal pillars 33 of the ELG element 14 can be omitted, the pad 22a of the ELG element 14 is connected to the pad 20b by a narrow connecting section 53, and the pad 22b of the ELG element 14 is connected to the pad 18a by a narrow connecting section 54. One of the lead layers 32 of the ELG element 14 is connected to the inner lead layer 42 of the magnetic head element section 12 by a narrow connecting section 55; the other lead layer 32 of the ELG element 14 is connected to the inner lead layer 39 of the magnetic head element section 12 by a narrow connecting section 56.

Namely, the terminal pillars 38 and 41 of the two magnetic head element sections 12, which are respectively located on both sides of the ELG element 14, are used as the terminal pillars of the ELG element 14.

With this structure, the ELG elements 14 have no terminal pillars, so that the width of the ELG elements 14 is narrower.

By employing the method of the present invention, as described above, the terminal pillars of the ELG elements, which are essential for the conventional method, can be omitted because the terminal pillars of the magnetic head element sections can be used as the common pillars, so that the width of the ELG elements 14 is narrower, the number of manufactured magnetic head elements can be increased, and and the manufacturing efficiency thereof can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of manufacturing magnetic head elements comprising the steps of: abrading a bar-shaped member, in which magnetic head elements and Electric Lapping Guide (ELG) elements are alternately formed, while monitoring the resistance value of specific parts of the ELG elements; and removing said ELG elements so as to form a plurality of magnetic head elements, characterized by:
   alternately forming a plurality of the magnetic head elements and a plurality of the ELG elements on a substrate;
   forming lead layers, each pair of which are connected to a specific part of each ELG element, and inner lead layers, a plurality of which are connected to each magnetic head element;
   connecting one of the lead layers connected to each ELG element, which is located closest to the adjacent magnetic head element, to one of the inner lead layers connected to each magnetic head element which is located closest to the adjacent ELG element;
   forming terminal pillars in the inner lead layers and the other lead layer connected to each ELG element;
   coating over the terminal pillars with an overcoating layer, which is made of an insulating material;
   abrading the overcoating layer so as to expose top ends of the terminal pillars;
   forming connecting pads on the exposed top ends of the terminal pillars and monitor pads on parts of the overcoating layer, which correspond to the lead layers having no terminal pillars;
   connecting the connecting pad of the terminal pillar which is formed in the one inner lead layer connected to each magnetic head element and which is located closest to the adjacent ELG element, to the monitor pad which corresponds to the one lead layer connected to each ELG element and which is located closest to the adjacent magnetic head element;
   cutting the substrate so as to form the bar-shaped member; and abrading a prescribed face of the bar-shaped member while monitoring the resistance value of the specific parts of the ELG elements via the monitor pads.

2. The method according to claim 1, wherein said step of forming the lead layers and
   the inner lead layers and said step of connecting the one lead layer, which is connected to each ELG element, to the one inner lead layer which is connected to each magnetic head element, are executed in one step.

3. The method according to claim 1,
   wherein said step of forming the connecting pads and the monitor pads and said step of connecting the connecting pads to the monitor pads are executed in one step.

4. A method of manufacturing magnetic head elements, comprising the steps of:
   abrading a bar-shaped member, in which magnetic head elements and Electric Lapping Guide (ELG) elements are alternatively formed, while monitoring resistance value of specific parts of the ELG elements; and removing the ELG elements so as to form a plurality of the magnetic head elements, characterized by:
   alternatively forming a plurality of the magnetic head elements and a plurality of the ELG elements on a substrate;
   forming lead layers, each pair of which are connected to a specific part of each ELG element, and inner lead layers, a plurality of which are connected to each magnetic head element;
   respectively connecting a pair of the lead layers which are connected to each ELG element to the nearest inner lead layers connected to the adjacent magnetic head element;
   forming terminal pillars in the inner lead layers;
   coating over the terminal pillars with an overcoating layer, which is made of an insulating material;
   abrading the overcoating layer so as to expose top ends of the terminal pillars;
   forming connecting pads on the exposed top ends of the terminal pillars and monitor pads on parts of the overcoating layer, which correspond to the lead layers having no terminal pillars;
   connecting the connecting pads of two inner lead layers which are connected to each magnetic head element, to the monitor pads which correspond to a pair of the lead layers connected to each ELG element;
   cutting the substrate so as to form the bar-shaped member; and
   abrading a prescribed face of the bar-shaped member while monitoring the resistance value of the specific parts of the ELG elements via monitoring pads.

5. The method according to claim 4,
wherein said step of forming the lead layers and the inner lead layers and said step of connecting the lead layers which are connected to each ELG element, to the inner lead layers which are connected to each magnetic head element, are executed in one step.

6. The method according to claim 4,
wherein said step of forming the connecting pads and the monitor pads and said step of connecting the connecting pads to the monitor pads are executed in one step.

* * * * *